Dec. 30, 1969   E. A. MAYER   3,486,521
FLOWING PROBE VORTEX DEVICE
Filed Dec. 8, 1967   2 Sheets-Sheet 1

INVENTOR.
Endre A. Mayer
BY James L. O'Brien
ATTORNEY.

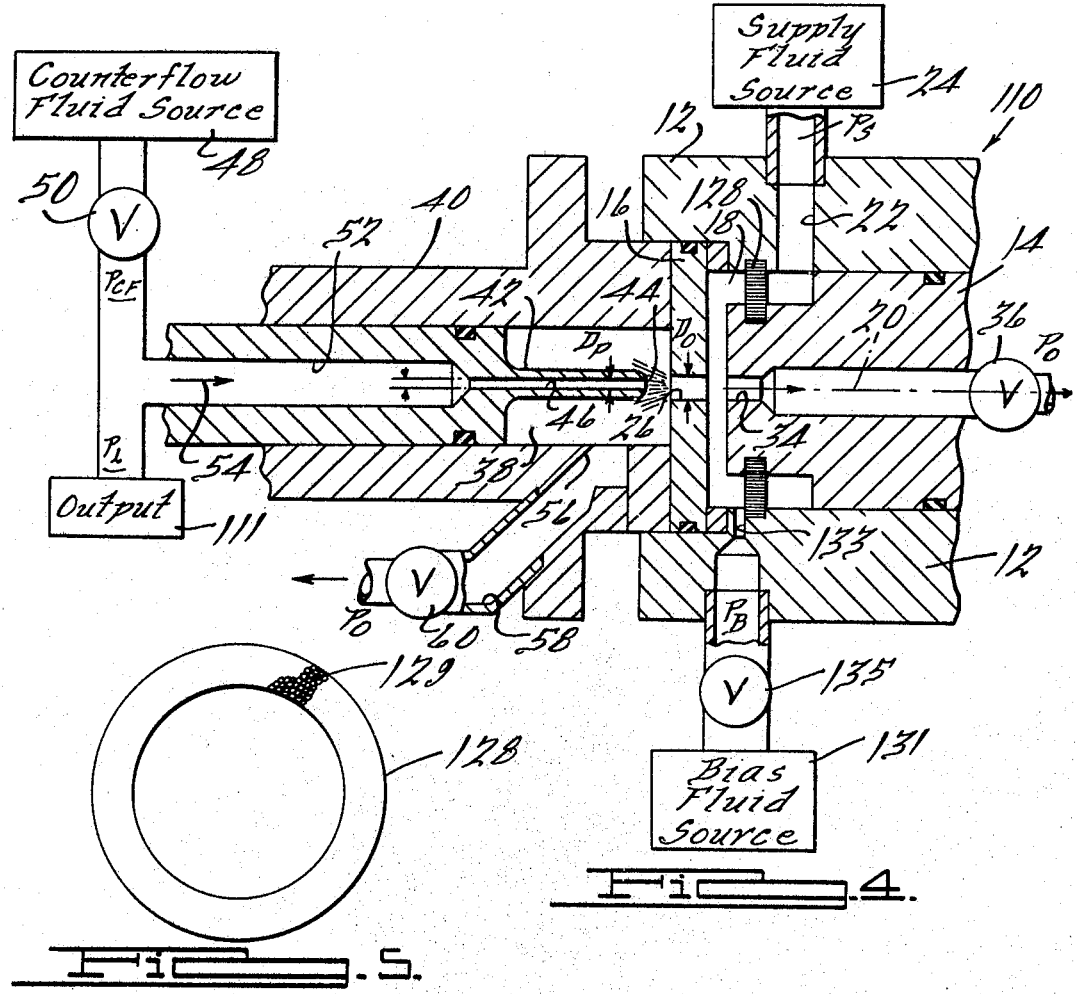
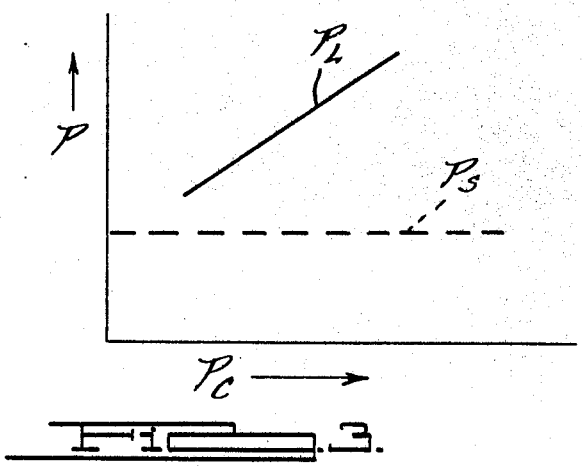

United States Patent Office 3,486,521
Patented Dec. 30, 1969

3,486,521
FLOWING PROBE VORTEX DEVICE
Endre A. Mayer, Birmingham, Mich., assignor to The Bendix Corporation, a corporation of Delaware
Filed Dec. 8, 1967, Ser. No. 689,089
Int. Cl. F15c 1/16
U.S. Cl. 137—81.5     9 Claims

ABSTRACT OF THE DISCLOSURE

A vortex device including a vortex housing for containing vortical flow about an axis having a supply opening, a vent opening, and an outlet opening disposed on the axis and further including a control for imparting a rotational velocity to fluids within the housing and an output probe positioned downstream of the vortex housing outlet opening being connected to a source of fluid to establish a counterflow out of the probe and to maintain the pressure within the probe at a pressure greater than the supply fluid pressure thereby providing an output signal at the output probe which is directly proportional to the rotational velocity of the fluid within the housing.

CROSS REFERENCE TO RELATED APPLICATIONS

Application by Endre Mayer for "Fluid Control Device," Ser. No. 539,761.

BACKGROUND OF THE INVENTION

Field of the invention

Fluidic devices, and more particularly, an improved vortex device.

Description of the prior art

The present invention is an improvement over the device shown in my co-pending application Ser. No. 539,761 entitled "Fluid Control Device." The device disclosed therein includes a vortex housing having a supply opening in combination with an outlet probe connected to a source of counterflow fluid. That device, as is typical of the prior art vortex devices, has an output signal which is inversely proportional to the control signal.

SUMMARY OF THE INVENTION

The present invention provides a novel vortex device having an output signal which is directly proportional to the control signal. This is accomplished by providing a vortex housing with a vent opening and an outlet opening disposed on the axis of fluid rotation in combination with an output probe disposed on the axis downstream of the outlet opening which is connected to a source of counterflow fluid at a pressure greater than the pressure of the supply fluid. Although the precise influence of the counterflow fluid and the vent opening upon the flow patterns of the vortex device is not known, it is believed that the counterflow penetrates the vortex chamber outlet opening thereby influencing the flow patterns within the vortex housing. Penetration of the outlet opening is believed to be possible because of the momentum imparted to the flow by the increased counterflow fluid pressure and the pressure relief inside of the vortex housing provided by the vent opening in the vortex housing. It is further believed that changes in the flow pattern within the vortex housing causes changes in the conical flow pattern of the fluid egressing from the outlet opening. The end result, phase reversal from the normal mode, is particularly predominant when the probe opening diameter is one half or less of the vortex housing outlet opening diameter. This enhanced effect is believed to be due to increased penetration of counterflow fluid provided by the narrower configuration of the output probe.

BRIEF DESCRIPTION OF THE DRAWINGS

FIGURE 3 is a graph showing the relationship between the control signal pressure and the output signal pressure of the vortex amplifier constructed according to the present invention.

FIGURE 4 is a cross-sectional view of a fluidic rate sensor utilizing an inertia element and incorporating the present invention.

FIGURE 5 is a detailed view of the inertia element shown in FIGURE 4.

DETAILED DESCRIPTION OF THE EMBODIMENTS (A) Description of the vortex amplifier FIGURE 1 is a cross-sectional view of a vortex amplifying device 10 constructed according to the present invention which is connected to a pressure-responsive output device 11. The amplifier 10 has housing portions 12, 14 and 16 defining a vortex chamber 18 of a predetermined width W for containing vortical flow about an axis 20 passing through the vortex chamber 18. The housing portion 12 is provided with a supply fluid opening 22 connected to a source of supply fluid 24 being at a pressure $P_S$. The housing member 12 is further provided with a control port 28 being oriented substantially tangentially of the vortex chamber 18 as shown in FIGURE 2 and being connected to a source of control fluid 30 at a pressure $P_C$ through a control valve 32. As will be understood by one skilled in the art, a flow from control port 28 will impart a rotational velocity to the supply fluid in accordance with the control fluid pressure $P_C$. As will also be understood by one skilled in the art, the control apparatus shown and described may be replaced by any suitable vortex control apparatus.

Figure 1:
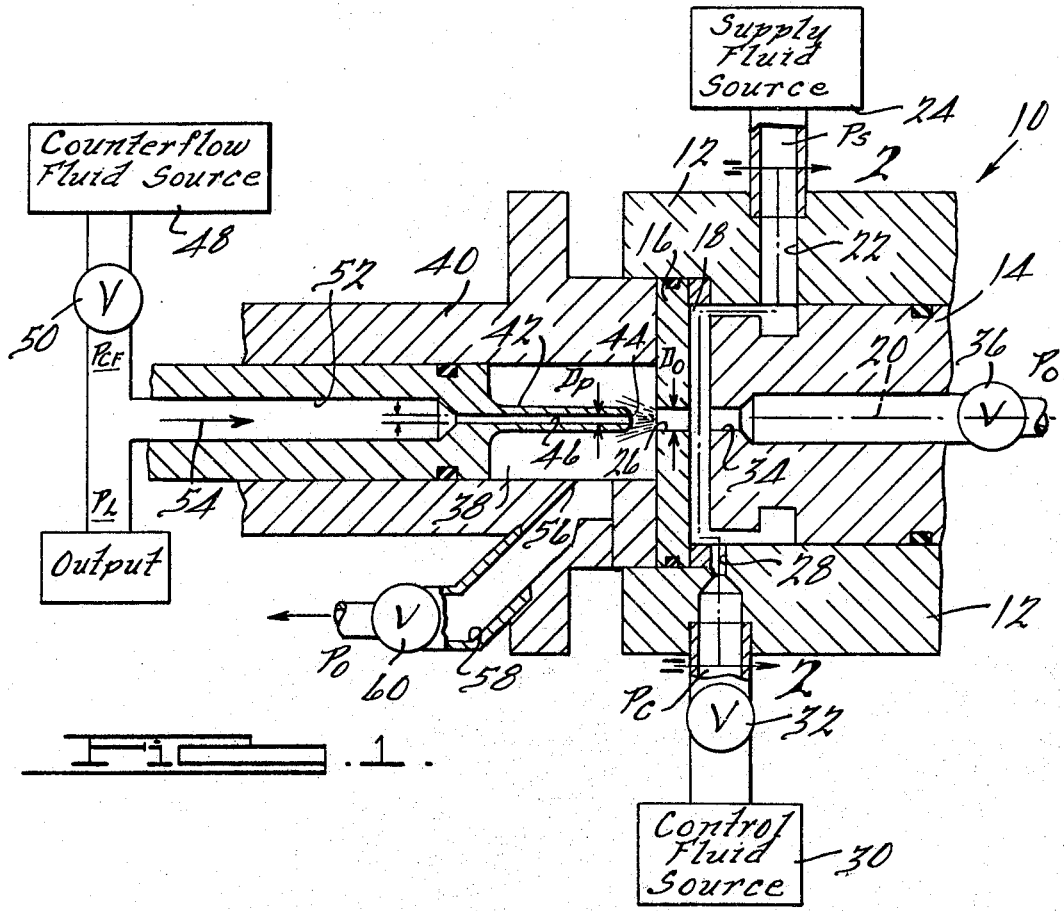
FIGURE 1 is a cross-sectional view of a vortex amplifier incorporating the present invention.

Housing portion 16 is provided with an outlet opening 26 having a diameter $D_O$ disposed on axis 20 for egress of the supply and control fluid in the vortex chamber 18. The vortex housing member 14 is provided with a pressure relief vent 34 communicating with ambient pressure $P_O$ through vent valve 36. The vortex amplifying device 10 is further provided with an outlet chamber 38 formed by an outlet housing 40 for receiving the flow from the outlet opening 26. The vortex amplifier 10 is still further provided with an output probe or fluid line 42 encompassed by the outlet housing 40. The probe 42 has an outlet opening 44 of a diameter $D_P$ at one end thereof disposed on axis 20 a predetermined distance downstream of the vortex chamber outlet opening 26. The opening 44 communicates with an output probe passageway 46 extending through the output probe 42.

A source 48 of counterflow fluid communicating with the probe passage 46 through flow regulating valve 50 and passage 52 is provided for establishing a flow at a substantially constant flow rate in the direction of arrow 54 at a counterflow pressure $P_{CF}$ which flow egresses from probe opening 44 into the outlet chamber 38. The counterflow pressure $P_{CF}$ is at all times maintained at a pressure greater than the supply pressure $P_S$. The outlet chamber housing 40 is provided with an outlet housing vent opening 56 for egress of the fluids within the outlet chamber 38 through an outlet housing vent passage 58 and an outlet housing vent valve 60 which is adjustable to control the pressure within outlet chamber 38. The output device 11 is also connected to the output probe passage 46 through output passage 52 to provide an output pressure signal $P_L$ which is substantially equal to the counterflow pressure $P_{CF}$. Due to the novel construction of the vortex amplifier 10, the output pressure $P_L$ will be directly, rather than inversely, proportional to the control pressure $P_C$ as shown by the graph of FIGURE 3. In other words, as $P_C$ is increased, $P_L$ will be increased.

(B) Operation of the vortex amplifier

Supply fluid is introduced into the vortex chamber 18 through supply opening 22. In the absence of a control flow from control opening 28, the supply fluid flows radially through the vortex chamber 18 to the outlet opening 26. A flow of control fluid from the control opening 28 into the vortex chamber 18 imparts a rotational velocity to the supply fluid. As a result a vortical flow pattern is established in the vortex chamber 18 which in turn establishes a conical dispersion flow pattern downstream of the outlet opening 26. As the control flow is increased, the rotational velocity of the supply fluid in the vortex chamber 18 is correspondingly increased and in turn the conical dispersion pattern is widened. In the prior art vortex devices, the widening of the conical dispersion pattern causes a reduced pressure at the output probe opening 44 since less of the outlet flow impinges on the opening 44. Accordingly, in prior art vortex devices, the pressure at the probe opening 44 is inversely proportional to the control flow. In other words, the output pressure $P_L$ in passageways 52 and 46 decreases as the control pressure $P_C$ increases.

The addition of an output probe counterflow and a vent opening 34 to a basic vortex amplifier as taught by this invention occasions an unexpected result in that the output pressure $P_L$ is directly proportional to the control pressure $P_C$ as shown in the graph of FIGURE 3. In order to obtain this result, the counterflow pressure $P_{CF}$ must be greater than the pressure $P_S$ of the supply fluid and the source of counterflow fluid must be regulated so as to provide fluid at a substantially constant flow rate. Since the counterflow fluid pressure $P_{CF}$ is always greater than the supply fluid pressure $P_S$, the output pressure $P_L$, which as stated before is approximately equal to the counterflow fluid pressure $P_{CF}$, is also always greater than the supply fluid pressure $P_S$ as illustrated in FIGURE 3. This is an important additional advantage provided by the present invention since high output pressures are necessary for the operation of many fluid pressure responsive devices. The flow mechanism that is responsible for this phenomena is not known because of the many problems involved in analyzing the highly complex flow pattern of the vortex device. However, it is believed that the counterflow directly influences the vortical flow pattern within the vortex chamber 18. It is believed that the combination of a counterflow pressure $P_{CF}$ that is greater than the supply pressure $P_S$ and a pressure relief vent 34 establishes the conditions which allow the counterflow to directly influence the vortical flow within the vortex chamber 18. The effect is particularly pronounced when the output probe opening diameter $P_P$ is approximately one half of the outlet opening diameter $D_O$. Apparently, resulting narrower counterflow stream is more capable of penetrating the vortex chamber outlet opening 26.

(C) Description of the rate sensor

Figure 2:
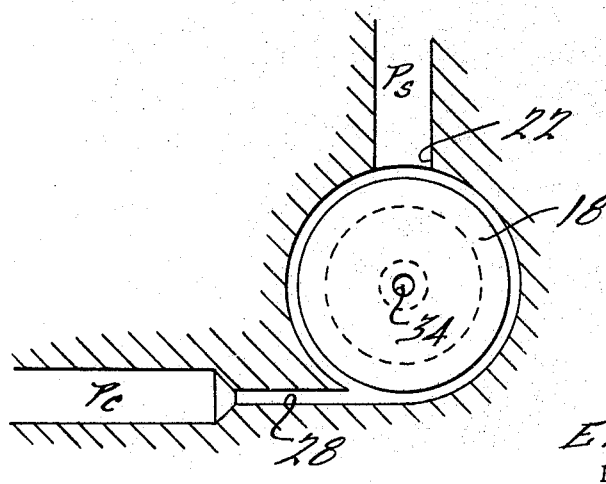
FIGURE 2 is a cross-sectional view taken along line 2—2 of FIGURE 1.

A fluidic rate sensor 100, constructed according to the present invention, is shown in FIGURE 4 connected to a fluid pressure responsive output device. Since the rate sensor 100 is in most respects identical in construction to the vortex amplifying device 10, like numerals are used in FIGURE 4 to indicate like components in FIGURES 1 and 2. In addition to the structure heretofore described the rate sensor 100 includes an inertia element 128, shown in detail in FIGURE 5, disposed in the vortex chamber 18 by attachment to housing members 12 and 14. The inertia element 128 is comprised of an array of flow channels 129 for passage of the supply fluid therethrough. The housing member 12 is provided with a bias port 133 being oriented substantially tangentially of the vortex chamber 18 and being connected to a source of bias fluid at a pressure $P_B$ through a bias valve 135.

(D) Operation of the rate sensor

Supply fluid is introduced into the vortex chamber 18 through supply opening 22. The supply flows through the inertia element 128 and thereafter has a biasing rotational velocity imparted to it by the flow from bias port 129. When the rate sensor 100 experiences a rotation having a component along the axis 20, the inertia element 128 influences the vortical flow in vortex chamber 18 by either increasing or decreasing the rotational velocity of the supply fluid in the vortex chamber 1. As will be understood by those skilled in the art, the change in rotational velocity of the supply fluid is proportional to the rotational rate of the rate sensor 100 about the axis 20. In the manner of operation described above, an output signal at the output device 11 is provided which is directly proportional to the control signal which, in this case, is the rotational rate about the axis 20.

This invention is an important advancement in the art in that it provides a vortex amplifier having an output pressure signal which is directly proportional to the output pressure signal and which operates at high mean output pressures.

Although this invention has been disclosed and illustrated with reference to particular applications, the principles involved are susceptible of numerous other applications which will be apparent to persons skilled in the art.

Having thus described my invention I claim:

1. Apparatus comprising:
   a source of supply fluid at a preselected pressure;
   a vortex housing for containing vortical flow about an axis, said vortex housing having a supply opening for receiving said supply fluid, a vent opening and an outlet opening disposed on said axis for egress of said supply fluid;
   control means for imparting rotational flow to said supply fluid within said housing about said axis;
   an output fluid line for providing an output pressure signal which is directly proportional to the rate of said rotational flow having an opening at one end thereof disposed on said axis a preselected distance downstream of said outlet opening; and
   a source of counterflow fluid at a preselected pressure greater than said supply fluid pressure and at a substantially constant flow rate connected to said output fluid line.

2. The apparatus of claim 1 wherein said fluid line opening is a circular opening having a diameter $D_P$ and said outlet opening is a circular opening having a diameter $D_O$ which is approximately $2D_P$.

3. The apparatus of claim 1 further including valve means connected to said vent opening for providing a controllable pressure in said vortex housing.

4. The apparatus of claim 1 further including an outlet housing having a vent opening therein, said outlet housing encompassing said outlet opening and said outlet fluid line opening for receiving flow therefrom.

5. The apparatus of claim 4 further including valve means connected to said outlet housing vent opening for controlling the pressure within said outlet housing.

6. The apparatus of claim 1 wherein said control means includes:
   a source of control fluid; and
   control fluid passage means connecting said source of control fluid with said vortex housing for directing said control fluid substantially tangentially into said vortex housing thereby causing rotational flow of said supply fluid within said vortex housing in proportion to the flow of said control fluid.

7. A rate sensor comprising:
a source of supply fluid at a preselected pressure;
a vortex housing for containing vortical flow about an axis, said vortex housing having a supply opening for receiving said supply fluid, a vent opening and an outlet opening disposed on said axis for egress of said supply fluid;
inertia means disposed in said vortex housing between said supply opening and said outlet opening for influencing vortical flow in said housing in accordance with a rotational rate of said vortex housing about said axis;
an output fluid line for providing an output pressure signal which is directly proportional to the rate of said rotational flow having an opening at one end thereof disposed on said axis a preselected distance downstream of said outlet opening; and
a source of counterflow fluid at a preselected pressure greater than said supply fluid pressure and at a preselected substantially constant flow rate being connected to said output fluid lines.

8. The rate sensor of claim 7 further including:
a source of biasing fluid; and
biasing fluid passage means connecting said source of biasing fluid with the vortex housing for directing said biasing fluid substantially tangentially into said vortex housing thereby causing a biasing vortical flow of said supply within said vortex housing.

9. The rate sensor of claim 7 wherein said fluid line opening is a circular opening having a diameter $D_P$ and said outlet opening is a circular opening having a diameter $D_O$ which is approximately $2D_P$.

References Cited

UNITED STATES PATENTS

| | | | |
|---|---|---|---|
| 3,181,546 | 5/1965 | Boothe | 137—81.5 |
| 3,207,168 | 9/1965 | Warren | 137—81.5 |
| 3,272,215 | 9/1966 | Bjornsen et al. | 137—81.5 |
| 3,336,931 | 8/1967 | Fox et al. | 137—81.5 |
| 3,366,370 | 1/1968 | Rupert | 137—81.5 |
| 3,386,290 | 6/1968 | Egli | 137—81.5 X |
| 3,395,720 | 8/1968 | Brooks | 137—81.5 |

M. CARY NELSON, Primary Examiner

W. R. CLINE, Assistant Examiner